United States Patent
Malik et al.

(10) Patent No.: US 6,762,225 B2
(45) Date of Patent: Jul. 13, 2004

(54) LIGHT STABILIZER COMPOSITION

(75) Inventors: Jan Malik, St. Louis (FR); Christoph Kröhnke, Breisach-Oberrimsingen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/220,990

(22) PCT Filed: Mar. 9, 2001

(86) PCT No.: PCT/IB01/00332

§ 371 (c)(1),
(2), (4) Date: Sep. 6, 2002

(87) PCT Pub. No.: WO01/66628

PCT Pub. Date: Sep. 13, 2001

(65) Prior Publication Data

US 2003/0087998 A1 May 8, 2003

(30) Foreign Application Priority Data

Mar. 10, 2000 (GB) .......................................... 00005629

(51) Int. Cl.⁷ ............................................... C08K 5/34
(52) U.S. Cl. ..................................... 524/100; 524/102
(58) Field of Search ................................... 524/10, 102

(56) References Cited

U.S. PATENT DOCUMENTS

| | | | |
|---|---|---|---|
| 5,405,917 A | 4/1995 | Mueller, Jr. et al. | 525/333.8 |
| 5,663,351 A | 9/1997 | Kampmann et al. | 546/185 |
| 6,225,385 B1 | 5/2001 | Stahrfeldt et al. | 524/119 |

FOREIGN PATENT DOCUMENTS

| | | |
|---|---|---|
| GB | 2 100 268 | 12/1982 |
| GB | 2 156 360 | 10/1985 |
| WO | WO 89/08669 | 9/1989 |

*Primary Examiner*—Kriellion A. Sanders
(74) *Attorney, Agent, or Firm*—Anthony A. Bisulca

(57) ABSTRACT

The invention relates to a light stabilizer composition obtainable by the process comprising the steps of
  a) mixing a polymer with at least one polyalkylpiperidine and at least one free radical generator
  b) melt-blending of that mixture at a temperature above the melting point of the polymer and above the decomposition temperature of the free radical generator and at shear conditions sufficient to blend the components.

The invention also provides a method for enhancing the light stability of polymers, preferably polyolefins.

14 Claims, No Drawings

LIGHT STABILIZER COMPOSITION

The invention relates to stabilizer compositions as well as to a method for enhancing the light stability of polymers, in particular polyolefins.

It is the object of the present invention to provide an improved stabilizer composition for stabilizing polymers, in particular polyolefins, against the damage effected by light.

This object is achieved with the stabilizer composition as hereinunder described. It has surprisingly been found that masterbatch compositions of polyalkylpiperidines prepared in the presence of a free radical generator, exhibit an increased stabilization activity compared to the stabilization activity of masterbatch compositions according to the prior art which are produced without the addition of a free radical generator.

Accordingly, the present invention provides a light stabilizer composition obtainable by the process comprising the steps of
  a) mixing a polymer with at least one polyalkylpiperidine and at least one free radical generator
  b) melt-blending of that mixture at a temperature above the melting point of the polymer and above the decomposition temperature of the free radical generator and at shear conditions sufficient to blend the components.

The melt-blending temperature varies with the type of polymer and the type of the free radical generator. The skilled person can readily ascertain the appropriate temperature but a typical temperature range comprises the range from about 130° C. to about 300° C., preferably the range from about 150° C. to about 230° C.

The free radical generator is preferably a peroxide or hydroperoxide compound, in particular an organic peroxide compound. Suitable free radical generators are selected from the group consisting of dicumyl peroxide; 2,5-bis-tert.-butylperoxy-2,5-dimethylhexane; di-tert.-butyl-peroxide; isopropyl-tert.-butyl peroxy carbonate; bis-(tert.-butyl-2-peroxyisopropyl)-1,3-benzene; dimethyl-2,5-bis-(tert.-butylperoxy)-2,5-hexane; dimethyl-2,5-bis-(tert.-butylperoxy)-2,5-hexine-3; tert.-(butylcumyl peroxide, bis-(tert.-butyl)-3,3-ethyl butyrate.

The polyalkylpiperidine is an oligomeric or a high molecular-weight polyalkylpiperidine or a low molecular-weight polyalkylpiperidine or a polymer bound polyalkylpiperidine.

Preferably, the oligomeric or high molecular-weight polyalkylpiperidine is selected from the group consisting of compounds of formulae (I) to (VIII):

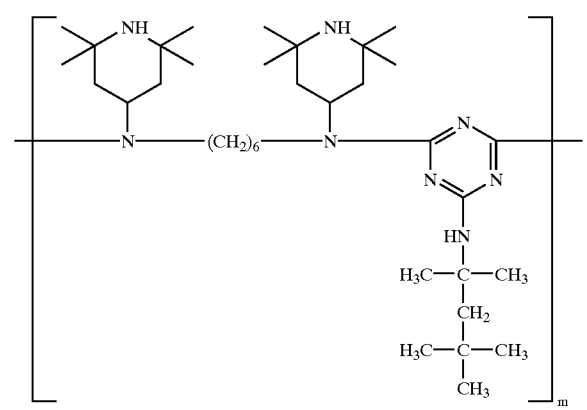

(I)

poly-{[6-[(1,1,3,3-tetramethylbutyl)-imino]-1,3,5-triazine-2,4-diyl][2-(2,2,6,6-tetra-methyl-piperidyl)-amino]-hexamethylene-[4-(2,2,6,6-tetramethylpiperidyl)-imino]} (I)

[Commercially available for example as Chimassorb (registered trademark) 944 (Ciba Specialty Chemicals Inc.)]

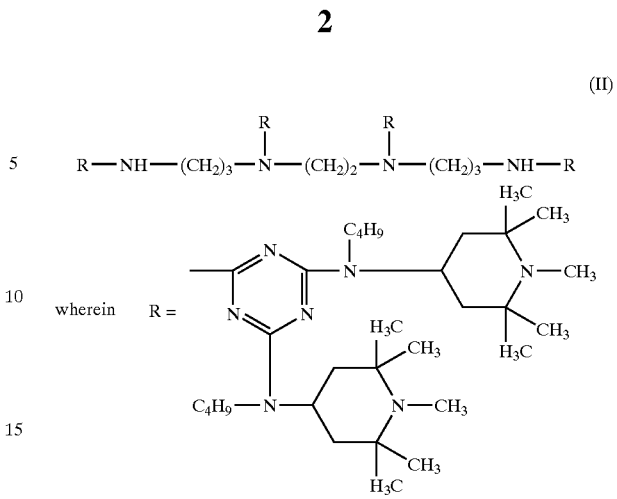

(II)

1,3,5-triazine-2,4,6-triamine, N,N'''-1,2-ethanediylbis[N-[3-[[4,6-bis[butyl(1,2,2,6,6-pentamethyl-4-piperidinyl)amino]-1,3,5-triazin-2-yl]methylamino]propyl]-N',N''-dibutyl-N', N''-bis-(1,2,2,6,6-pentamethyl-4-piperidinyl)- (II)

[Commercially available for example as Chimassorb (registered trademark) 119 ((Ciba Specialty Chemicals Inc.)]

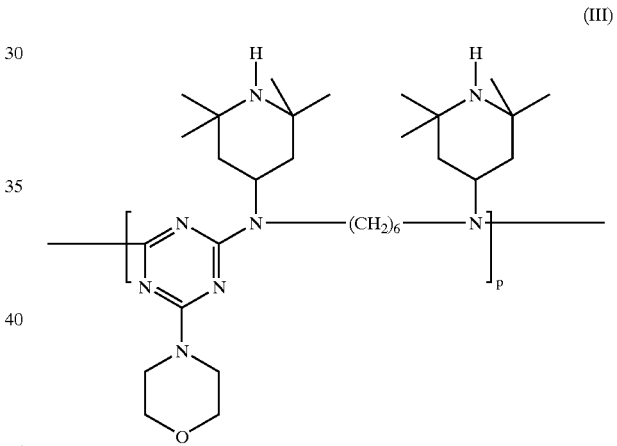

(III)

poly[(6-morpholino-s-triazine-2,4-diyl)[2,2,6,6-tetramethyl-4-piperidyl)-imino]-hexamethylene[(2,2,6,6-tetramethyl-4-piperidyl)imino] (III)

[Commercially available for example as Cyasorb (registered trademark) UV 3346 (American Cyanamid Inc.)]

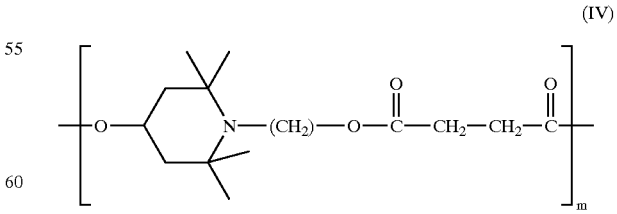

(IV)

poly-(N-β-hydroxyethyl-2,2,6,6-tetramethyl-4-hydroxy-piperidyl-succinate) (VI)

[commercially available for example as Tinuvin (registered trademark) 622 (Ciba Specialty Chemicals Inc.).

(V)

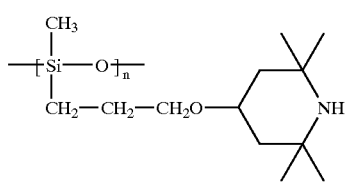

polymethylpropyl-3-oxy-[4(2,2,6,6 tetramethyl)-piperidinyl]-siloxane (V)

[Commercially available for example as Uvasil (registered trademark) 299 (Great Lakes Chemical Corp.)]

Oligomer obtained by the reaction and subsequent oligomerization of 2,2,4,4-tetramethyl-21-oxo-7-oxa-3,20-diazadispiro-[5.1.11.2]-heneico (VI) sane or its hydrochloride with epichlorohydrine.

[Commercially available for example as Hostavin (registered trademark) N-30 (Hoechst)]

(VII)

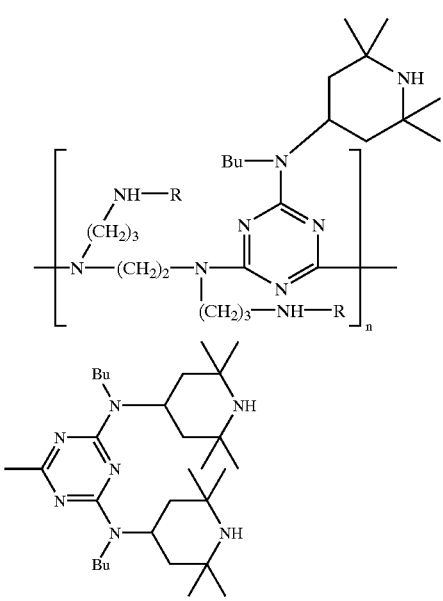

Bu = butyl 1,3-propanediamine, N,N''-1,2'-ethanediyl-bis-, polymer with N-butyl-2,2,6,6-tetramethyl-4-piperidinamine and 2,4,6-trichloro-1,3,5-triazine (VII)

[commercially available for example as Uvasorb (registered trademark) HA-88]

(VIII)

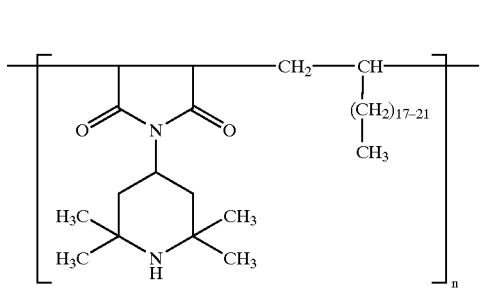

poly-[3-eicosyl(-tetracosyl)-1-(2,2,6,6-tetramethylpiperidine-4-yl)-pyrrolidine-2,5-dione] (VIII)

[commercially available for example as Uvinul 5050 H]

Preferably, the low molecular-weight polyalkylpiperidine is selected from the group consisting of compounds of formulae (IX) to (XIII)

(IX)

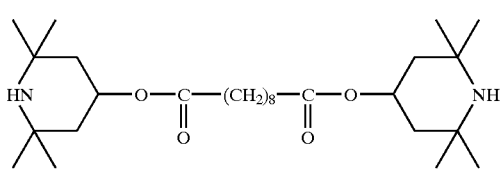

bis-2,2,6,6-tetramethyl-4-piperidyl-sebacate (IX)

[commercially available for example as Tinuvin (registered trademark) 770 (Ciba Specialty Chemicals Inc.)]

(X)

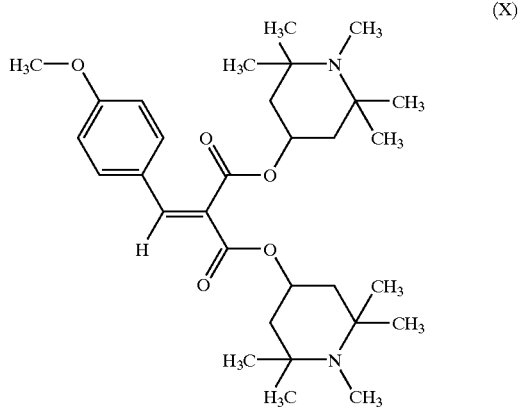

propanedioic acid, [(4-methoxyphenyl)-methylene]-bis(1,2,2,6,6-pentamethyl-4-piperidinyl)-ester] (X)

[Commercially available for example as Sanduvor (registered trademark) PR 31 (Clariant)]

(XI)

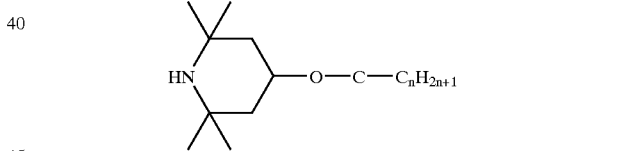

n = 15–17 a mixture of esters of 2,2,6,6-tetramethyl-4-piperidinol and higher fatty acids (mainly stearic acid) (XI)

[commercially available for example as Dastib (registered trademark) 845 or Cyasorb (registered trademark) UV 3853]

(XII)

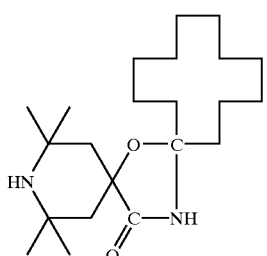

2,2,6,6-tetramethyl-21-oxo-7-oxa-3,20-diazadispiro [5.1.11.2]-heneicosane (XII)

[commercially available for example as Hostavin (registered trademark) N-20 (Hoechst)]

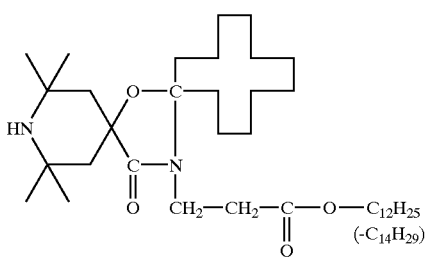 (XIII)

2,2,4,4-tetramethyl-21-oxo-7-oxa-3,20-diazadispiro [5.1.11.2]-heneicosan-20-propanoic-acid-dodecyles (XIII)

[commercially available for example as Hostavin (registered trademark) N-24 (Hoechst)].

The polyalkylpiperidine is typically used in an amount of from 0.1 to 70% by weight, preferably from 5 to 30% by weight based on the weight of the polymeric composition.

Typical quantities of the free radical generator is from 0.01 to 10% by weight, preferably from 0.1 to 2% by weight based on the weight of the polymeric composition.

All compounds of formulae (I) to (XIII) are known or may be made from known compounds by known methods.

The polymer of the stabilizer composition according to the invention is a thermoplastic organic polymer, preferably selected from polyolefins and copolymers and blends thereof.

Further additives, which may be added, if appropriate, include antioxidants, UV-absorbers, pigments, dyes, nucleating agents, fillers, and property modifiers and several others commonly used.

A further object of the invention is a method for enhancing the light stability, preferably UV light stability, of polymeric materials, preferably thermoplastic organic polymers, which are identical or compatible with the polymer component of the stabilizer composition according to the invention. This method comprises incorporating before or during processing a stabilizing quantity of the stabilizing composition according to the invention into the polymeric material to be stabilized. The quantity of the light stabilizer composition according to the invention needed to confer an appreciable extent of stabilization varies with the amount of the polyalkylpiperidine compound as well as with the type of the polymer and the end use of the finished article. The skilled person can readily ascertain the appropriate quantity for the diverse fields of applications.

LIST OF THE SUITABLE FREE RADICAL GENERATORS

Dicumyl peroxide:

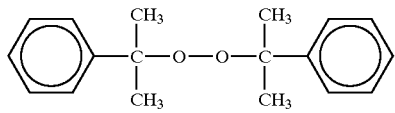

Di-tert.-butylperoxide:

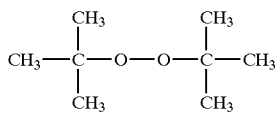

Bis(tert.-butyl-2-peroxyisopropyl)-1, 3-benzene:

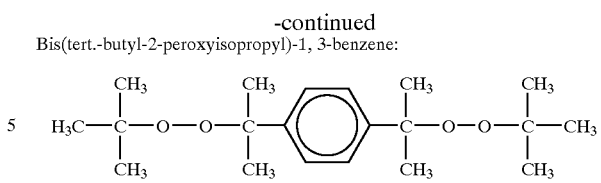

Dimethyl-2, 5-bis-(tert.-butylperoxy)-2, 5-hexane:

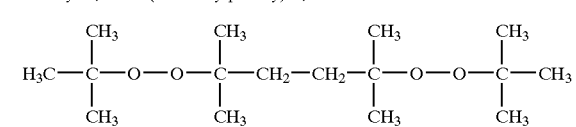

2, 5-dimethyl-2, 5-bis-(tert.-butylperoxy)-hex-3-yne:

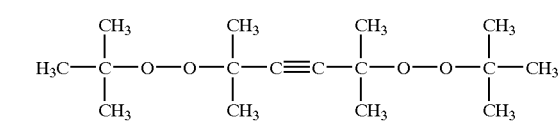

Tert.-butylcumyl peroxide:

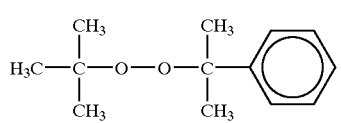

Bis-(tert.-butyl)-3, 3-ethyl-butyrate:

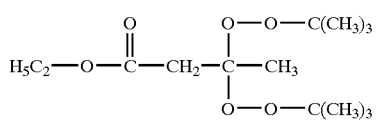

Isopropyl tert-butyl peroxy carbonate

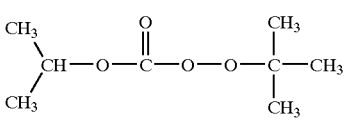

The invention is further illustrated by means of the following examples in which all parts are expressed by weight.

EXAMPLE 1

15%-compositions of polyalkylpiperidines in polypropylene (MFI=0.7 g/10 min at 230° C. and 2.16 kg) were prepared with different amounts of the free radical generator (FRI) 2,5-dimethyl-2,5-di-(t-butylperoxy)-hexane, as shown in Table 1. The compositions were first dry blended and then melt processed in a Brabender kneader at 200° C. during 10 minutes and at a main shaft rotation speed of 75/min. The melt blending in the Brabender kneader was done under a nitrogen atmosphere.

TABLE 1

| | Ligth stabilizer compositions | |
|---|---|---|
| Sample No. | HALS | FRI concentration [pph] |
| MB 1 | 15% C-944 | 0 |
| MB 2 | 15% C-944 | 0.1 |
| MB 3 | 15% C-944 | 0.5 |
| MB 4 | 15% C-944 | 1.5 |
| MB 5 | 15% T-770 | 0 |
| MB 6 | 15% T-770 | 0.5 |
| MB 7 | 15% PR-31 | 0 |
| MB 8 | 15% PR-31 | 0.5 |

C-944 = Chimassorb ® 944, T-770 = Tinuvin ® 770, PR-31 = Sanduvor ® PR-31

The prepared compositions were used for light stabilization of polypropylene (MFI=0.7 g/10 min at 230° C. and 2.16 kg) The PP powder was dry blended with 1% of ground composition (i.e. 0.15% concentration of HALS in the final stabilized PP polymer) and with 0 1% calcium stearate and 0.05% phenolic antioxidant (Irganox 1010).

These compositions were then melt homogenized by two extrusions in a single screw laboratory extruder at 210° C. and 270° C., respectively. The obtained stabilized polypropylene pellets were pressed at 230° C. to give 0.1 mm polymer films that were exposed to accelerated weathering test according to ASTM D-5208. The light stability of the individual samples was assessed according to development of carbonyl oxidation products in the exposed polymer films as measured by infrared spectroscopy.

The results of the carbonyl absorption measurements (Aco) after 1000 hours exposition to accelerated weathering (UV-A) are given in Table 2.

TABLE 2

Carbonyl index values of UV-stabilized PP-samples

| Sample No. | Light stabilization | Aco after 1000 hours |
|---|---|---|
| LS 1 | 1% MB 1 | 0.42 |
| LS 2 | 1% MB 2 | 0.33 |
| LS 3 | 1% MB 3 | 0.29 |
| LS 4 | 1% MB 4 | 0.25 |
| LS 5 | 1% MB 5 | 0.132 |
| LS 6 | 1% MB 6 | 0.119 |
| LS 7 | 1% MB 7 | 0.34 |
| LS 8 | 1% MB 8 | 0.28 |

EXAMPLE 2

Substrate: Polypropylene, type Profax 6508 (producer Himont, USA), base stabilized with 0.0114% Irganox 1076.

Prior to addition to this polymer, a masterbatch consisting of 15 weight-% of the commercially available HA(L)S-based stabilizer Sanduvor 3944 in polypropylene (Profax 6508) has been prepared at 200° C. using a kneader, type Brabender Plasticorder PLE 651 at 75 rpm under nitrogen.

Pre-extrusion of polypropylene with 1 weight-% of this masterbatch, 0.05 weight-% Irganox 1010, 0.10 weight-% Ca stearate and individually dosed amounts of the peroxide DBHP=Trigonox 101 is performed in a lab-extruder type T4 Händle KPS 25 at T=210° C./80 rpm whereas the final extrusion is carried out in an extruder, type T3 Göttfert at 270° C./50 rpm with a die diameter of 2 mm.

PP granules produced by means of this procedure have been used to prepare films of the dimension 140×140×0.1 mm using a lab press, type FontjneTP 600, at a temperature of T=230° C. and a pressure of 120 kN during 90 seconds. These films are submitted to artificial weathering tests by means of both Uvicon (UV-A) and Weather-o-meter CAM-7. The UV-A test is realized according to ASTM G 53 at a wavelength $\lambda_{max}$=340 nm with exposure intervals of 20 hours followed by a dark period of 4 hours. Measuring parameter is the time/hours to reach a carbonyl absorption of 0.5. The CAM-7 experiment is conducted according to DIN 53 385A using an UV-lamp with a power output of 6500 Watt. Dry periods of 102 minutes are followed by wet periods of 18 minutes. Measuring parameter is the time/hours to reach a carbonyl absorption of 0.3. Resulting data are summarized in table 1.

TABLE 1

| Formulation | UV-A, time to delta C═O = 0.5/ hours | CAM-7, time to delta C═O = 0.3/ hours |
|---|---|---|
| BS + 0.15% Sanduvor 3944 w/o Trigonox 101 | 1208 | 1682 |
| BS + 0.15% Sanduvor 3944 + 0.1% Trigonox 101 | 1264 | 1783 |
| BS + 0.15% Sanduvor 3944 + 0.5% Trigonox 101 | 1361 | 1827 |
| BS + 0.15% Sanduvor 3944 + 1.5% Trigonox 101 | 1486 | 1914 |

BS (base stabilization): 0.05% Irganox 1010 + 0.10% CaSt

What is claimed is:

1. A light stabilizer composition made by the process comprising the steps of:
   a) mixing a polymer with at least one polyalkylpiperdine wherein the polyalkylpiperidine is present in an amount from 0.1 to 70% by weight, based on the weight of the composition, and wherein the polyalkylpiperidine is an oligomeric or a high molecular-weight polyalkylpiperidine selected from the group consisting of compounds of formulae (I) to (VIII)

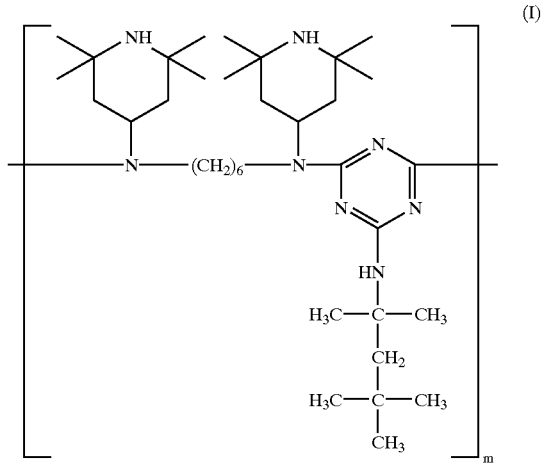

poly-{[6-[(1,1,3,3-tetramethylbutyl)-imino]-1,3,5-triazine-2,4-diyl][2-(2,2,6,6-tetra-methylpiperidyl)-amino]-hexamethylene-[4-(2,2,6,6-tetramethylpiperidyl)-imino]} (I),

II

R—NH—(CH$_2$)$_3$—N(R)—(CH$_2$)$_2$—N(R)—(CH$_2$)$_3$—NH—R wherein

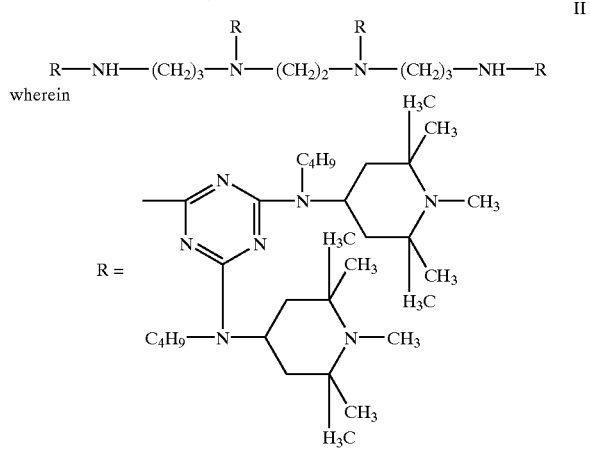

1,3,5-triazine-2,4,6-triamine N,N'''-[1,2-ethane-diyl-bis[[[4,6-bis-[butyl(1,2,2,6,6-penta-methyl-4- piperidinyl)amino]-1,3,5-triazine-2-yl]imino]-3,1-propanediyl]]bis[N',N"-dibutyl N',N"-bis(1,2,2,6,6,-pentamethyl-4-piperidinyl)-(II), (III)

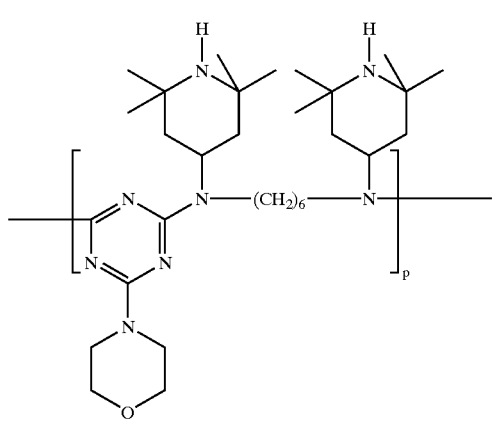

poly-[(6-morpholino-s-triazine-2,4-diyl)-[2,2,6,6-tetramethyl-4-piperidyl)imino]-hexa-methylene[(2,2,6,6-tetramethyl-4-piperidyl)imino] (III), (IV)

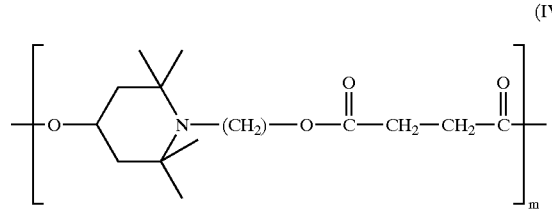

poly-(N-β-hydroxyethyl-2,2,6,6-tetramethyl-4-hydroxy-piperidyl-succinate) (IV), (V)

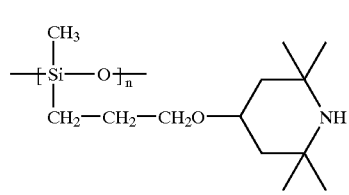

polymethylpropyl-3-oxy-[4(2,2,6,6-tetramethyl)-piperidinyl]-siloxane (V),

Oligomer obtained by the reaction and subsequent oligomerization of 2,2,4,4-tetramethyl-21-oxo-7-oxa-3,20-diazadispiro-[5.1.11.2]-heneicosane or its hydrochloride with epichlorohydrine, (VI), (VII)

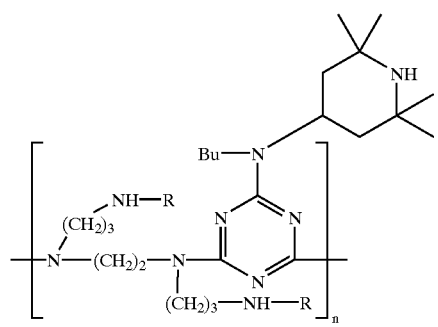

-continued

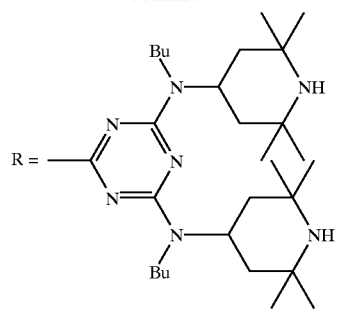

Bu = butyl 1,3-propanediamine, N,N"-1,3-ethanediylbis-, polymer with N-butyl-2,2,6,6-tetramethyl-4-piperidinamine and 2,4,6-trichloro-1,3,5-triazine (VII), (VIII)

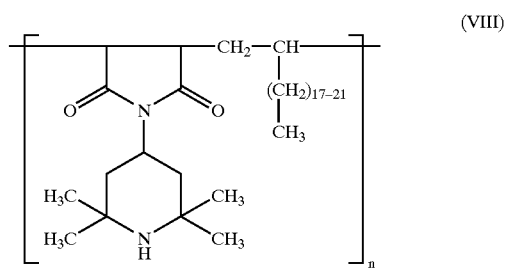

poly-[3-elcosyl-(-tetracosyl)-1-(2,2,6,6-tetramethylpi-peridin-4-yl)-pyrrolidin-2,5-dione] (VIII), or a low molecular-weight polyalkylpiperidine selected from the group consisting of compounds of formulae (IX) to (XIII):

(IX)

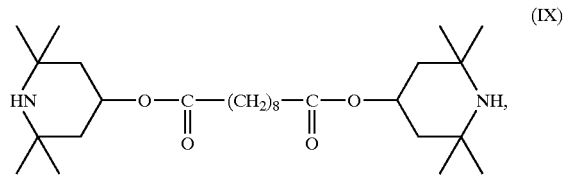

bis-2,2,6,6-tetramethyl-4-piperidyl-sebacate (IX), (X)

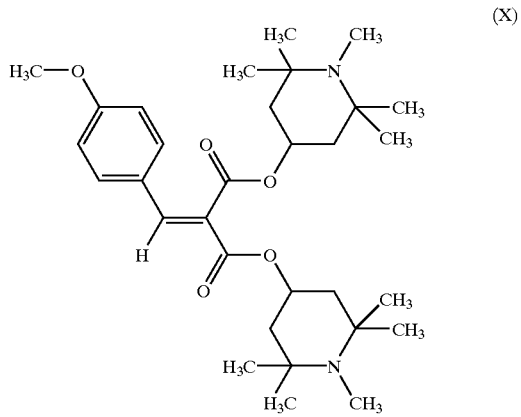

propanedioicacid, [(4-methoxyphenyl)-methylene]-bis(1,2,2,6,6-pentamethyl-4-piperidinyl)ester (X),

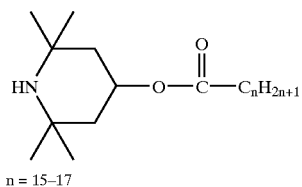

n = 15–17 a mixture of esters of 2,2,6,6-tetramethyl-4-piperidinol and higher fatty acids (mainly stearic acid) (XI),

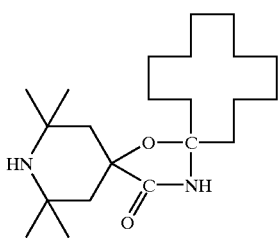

2,2,6,6-tetramethyl-21-oxo-7-oxa-3,20-diazadispiro [5.1.11.2]-heneicosane (XII),

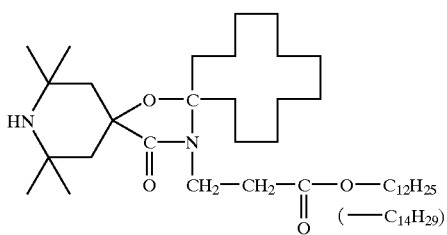

2,2,4,4-tetramethyl-21-oxo-7-oxa-3,20-diazadispiro [5.1.11.2]-heneicosan-20-propanoic-acid-dodecylester (XIII), or a polymer bound polyalkylpiperidine,
and at least one free radical generator to form a mixture b) melt-blending of the mixture at a temperature above the melting point of the polymer and above the decomposition temperature of the free radical generator and at shear conditions sufficient to blend the components.

2. A light stabilizer composition according to claim 1 wherein the free radical generator is a peroxide or hydroperoxide compound.

3. A light stabilizer composition according to claim 1 wherein the free radical generator is selected from the group consisting of dicumylperoxide; 2,5-bis-tert.-butyl-peroxy-2, 5-dimethylhexane; di-tert.-butylperoxide; isopropyl-tert.-butyl peroxy carbonate; bis(tert.-butyl-2-peroxyisopropyl)-1,3-benzene; dimethyl-2,5-bis-(tert.-butyl-peroxy)-2,5-hexane; 2,5-dimethyl-2,5-bis-(tert.-butylperoxy)-hex-3-yne; tert.-butyl-cumylperoxide; and bis-(tert.-butyl)-3,3-ethyl-butyrate.

4. A light stabilizer composition according to claim 1, wherein the amount of the free radical generator is from 0.01 to 10% by weight, based on the weight of the polymeric composition.

5. A light stabilizer composition according to claim 1, wherein the polymer is a thermoplastic organic polymer.

6. A light stabilizer composition according to claim 1, wherein the polymeric composition further comprises at least one additive.

7. A method for enhancing the light stability of a polymer compound comprising incorporating into the polymer compound, before or during processing, a stabilizing quantity of the stabilizer composition made according to claim 1.

8. A light stabilizer composition according to claim 1, wherein the free radical generator is an organic peroxide compound.

9. A light stabilizer composition according to claim 1, wherein the amount of the polyalkylpiperidines is from 5 to 30% by weight, based on the weight of the polymeric composition.

10. A light stabilizer composition according to claim 1, wherein the amount of the free radical generator is from 0.1 to 2% by weight, based on the weight of the polymeric composition.

11. A light stabilizer composition according to claim 5, wherein the thermoplastic organic polymer is selected from the group consisting of polyolefins, copolymers and blends thereof.

12. A light stabilizer composition according to claim 6, wherein the at least one additive is selected from the group consisting of antioxidants, UV-absorbers, pigments, dyes, nucleating agents, fillers, and property modifiers.

13. A polymer compound made in accordance with the method of claim 7.

14. A polymer compound comprising the light stabilizer composition made in accordance with the process of claim 1.

* * * * *